(12) United States Patent
Muscroft

(10) Patent No.: US 8,602,766 B2
(45) Date of Patent: Dec. 10, 2013

(54) ROTARY FORMING DEVICES AND METHODS FOR USING SUCH DEVICES

(75) Inventor: Colin Muscroft, St. Louis, MO (US)

(73) Assignee: Nestec S.A., Vevly (CH)

( * ) Notice: Subject to any disclaimer, the term of this patent is extended or adjusted under 35 U.S.C. 154(b) by 524 days.

(21) Appl. No.: 12/736,626

(22) PCT Filed: Apr. 22, 2009

(86) PCT No.: PCT/US2009/002498
§ 371 (c)(1),
(2), (4) Date: Dec. 9, 2010

(87) PCT Pub. No.: WO2009/151508
PCT Pub. Date: Dec. 17, 2009

(65) Prior Publication Data
US 2011/0104319 A1    May 5, 2011

Related U.S. Application Data

(60) Provisional application No. 61/125,854, filed on Apr. 29, 2008.

(51) Int. Cl.
B29C 43/08    (2006.01)
A21C 11/08    (2006.01)

(52) U.S. Cl.
USPC ........... 425/235; 425/237; 425/296; 425/298; 425/327; 425/365; 425/395; 426/512; 426/518

(58) Field of Classification Search
USPC ................. 425/146, 296–298, 113, 331, 365, 425/461–466, 235, 237, 327, 362–363, 374, 425/335, 395; 426/512, 517, 518, 524
See application file for complete search history.

(56) References Cited

U.S. PATENT DOCUMENTS

| | | | |
|---|---|---|---|
| 5,399,080 A * | 3/1995 | Van Benthum | 425/146 |
| 6,838,098 B2 * | 1/2005 | Bunkers et al. | 425/408 |
| 7,594,807 B2 * | 9/2009 | Yamazaki | 425/197 |
| 7,658,602 B2 * | 2/2010 | Fornaguera | 425/235 |

* cited by examiner

Primary Examiner — Richard Crispino
Assistant Examiner — Thukhanh Nguyen
(74) Attorney, Agent, or Firm — Julie M. Lappin; Robert M. Barrett

(57) ABSTRACT

Rotary forming devices and methods of using the rotary forming devices for producing products such as filled and unfilled "pillow" shaped products. In an embodiment, the invention provides a device comprising a housing comprising a die plate defining a plurality of outlets. The housing defines an inlet. A race plate is attached to the die plate. The race plate circumscribes the outlets of the die plate. A forming wheel is rotatably attached to the die plate. A motor assembly is attached to the forming wheel. The motor assembly is constructed and arranged to rotate the forming wheel in a hypocycloid motion.

20 Claims, 8 Drawing Sheets

ROTARY FORMING DEVICES AND METHODS FOR USING SUCH DEVICES

CROSS REFERENCE TO RELATED APPLICATIONS

This application is a national stage application under 35 U.S.C. §371 of PCT/US2009/002498 filed Apr. 22, 2009, which claims priority to U.S. Provisional Application Ser. No. 61/125,854 filed Apr. 29, 2008, the disclosures of which are incorporated herein by reference.

BACKGROUND OF THE INVENTION

1. Field of the Invention

The invention relates generally to product forming devices and particularly to rotary forming devices and methods of using the rotary forming devices to produce products such as filled and unfilled "pillow" shaped products.

2. Description of Related Art

Products such as kibbles or biscuits that are "pillow" shaped are currently made via a stand alone crimping device that is typically situated two to three meters away from an extruder exit. Ropes of extrudate are then conveyed to this crimping device and pillows are formed and sealed through the use of a "sprocket" crimping device. This type of crimping device is prone to fouling, is limited in throughput, and is expensive, e.g., requires a large capital investment. Extruder throughput rates are also limited by other traditional crimping equipment.

Dual multi-textured food products can also be made using conventional crimping equipment. The dual multi-textured food products can be made by co-extruding a cylindrical outer shell of one material and inner filling or core of a different material. If the viscosities of the shell and core material are high enough, the extruded ropes can be cut by rotating cutting blades into smaller pieces or kibbles. Conversely, if the core material is of a lower viscosity, it may flow away from the shell after it is cut. Therefore, instead of only cutting the ropes into smaller pieces, the shell has to be crimped at the ends to enclose and retain the flowable core. Production of crimped kibbles such as powder filled or granular filled kibbles is also a method of protecting sensitive ingredients in the core or of occluding objectionable aromas.

The current technology for producing center-filled kibbles where the core layer is completely enclosed requires a separate piece of crimping equipment after extrusion and an extension of the production line. Further, the method of pulling and crimping the co-extruded ropes are fraught with problems such as maintaining a continuous rope feeding into the crimper and avoiding entanglements. Consequently, these problems reduce production output of the sealed or crimped center-filled kibbles. There is, therefore, a need for new devices and methods for forming "pillow" shaped products, whether filled or unfilled.

SUMMARY OF THE INVENTION

The invention provides rotary forming devices and methods of using the rotary forming devices. In a general embodiment, the invention provides a forming device comprising a die plate defining an outlet, a race plate attached to the die plate, and a forming wheel rotatably attached to the die plate.

In an embodiment, the die plate is attached to an extrusion device such as an extruder.

In an embodiment, the race plate circumscribes the outlet of the die plate and the forming wheel is constructed and arranged to rotate within the race plate in a hypocycloid motion.

In an embodiment, a circumferential outer surface of the forming wheel maintains contact with an inner surface of the race plate at specific points during each rotation of the forming wheel.

In an embodiment, a rotation of the forming wheel forces a material exiting the outlet of the die plate against the inner surface of the race plate.

In an embodiment, the die plate defines a plurality of outlets.

In an embodiment, a point on a circumferential outer surface of the forming wheel moves across a same corresponding point on the die plate outlet during continuous revolutions of the forming wheel.

In an embodiment, the die plate further comprises a concentric solid core within the outlet. The solid core has a width or diameter less than the outlet.

In an embodiment, the die plate further comprises a concentric inner outlet within the outlet. The inner outlet has a width or diameter less than the outlet.

In an embodiment, the forming wheel defines a recessed molded shape at a circumferential surface of the forming wheel.

In another embodiment, the invention provides a forming device comprising a housing comprising a die plate defining a plurality of outlets. The housing defines an inlet. A race plate is attached to the die plate. The race plate circumscribes the outlets of the die plate. A forming wheel is rotatably attached to the die plate. A motor assembly is attached to the forming wheel. The motor assembly is constructed and arranged to rotate the forming wheel in a hypocycloid motion. In an embodiment, the housing is attached to an extrusion device such as an extruder. In an embodiment, one or more parts of the motor assembly are located in the housing. In an embodiment, the motor assembly comprises at least one counter balance attached to a shaft of the motor assembly.

In an embodiment, a rotation of the forming wheel forces a material exiting the outlets of the die plate against the inner surface of the race plate.

In an alternative embodiment, the invention provides a method of forming a product. The method comprises providing a die plate defining an outlet, a race plate attached to the die plate, and a forming wheel rotatably attached to the die plate. The method further comprises extruding a material a first distance through the outlet of the die plate, and forcing a portion of the material exiting the outlet of the die plate against an inner surface of the race plate by rotating the forming wheel.

In an embodiment, the race plate circumscribes the outlet of the die plate and the forming wheel is rotated in a hypocycloid motion.

In an embodiment, the material is selected from the group consisting of a cereal-based food, protein-based food, human food, non-human animal food such as a pet food, plastic polymer, and combinations thereof.

In yet another embodiment, the invention provides a method of forming a product. The method comprises providing a die plate defining a plurality of outlets, a race plate attached to the die plate and circumscribing the outlets, and a forming wheel rotatably attached to the die plate. The method further comprises extruding a material a first distance through the outlets of the die plate and forcing a first portion of the material exiting the outlets of the die plate against an inner surface of the race plate by rotating the forming wheel in a hypocycloid motion. The material is extruded a second distance through the outlets of the die plate, and a second portion of the material exiting the outlets of the die plate is forced against the inner surface of the race plate by rotating the forming wheel in a hypocycloid motion.

An advantage of the invention is to provide an improved product forming device.

Another advantage of the invention is to provide an improved product forming method.

Yet another advantage of the invention is to provide a product forming method having an increased production rate of crimped products over conventional crimping technology.

Still another advantage of the invention is to provide a forming device resulting in reduced capital expenditures over existing product forming equipment.

Another advantage of the invention is to provide an improved device for making center-filled products.

Yet another advantage of the invention is to provide an improved method for making center-filled products.

Still another advantage of the invention is to provide an improved product molding device.

Additional features and advantages are described herein, and will be apparent from the following Detailed Description and the figures.

DETAILED DESCRIPTION OF THE INVENTION

The invention provides rotary forming devices and methods of using the rotary forming devices. The rotary forming devices can be used for forming thermoplastic extruded materials and for continuously forming extruded foods. The rotary forming devices can be used to replace traditional crimping and molding equipment and can be attached directly to the end of an extrusion apparatus. The rotary forming devices can be used for crimping, stamping, or molding products in various applications. In addition, the rotary forming devices can have the same space requirements as a traditional knife drive, thereby eliminating the need for external forming equipment and mechanical conveyors. As a result, the forming devices have distinct advantages of not reducing the output rate of the extruder and being inexpensive compared to traditional crimping equipment (e.g. approx 10% of the cost).

In a general embodiment illustrated in FIGS. 1-4, the invention provides a forming device 10 comprising a die plate 20 defining one or more outlets 22. It should be appreciated that the die plate 20 can define any number of outlets 22. The outlets 22 can have any suitable shape (e.g. circle, square, or polygon) and be in any configuration on the die plate 20.

The forming device 10 further comprises a race plate 30 attached to a face of the die plate 20. In an embodiment, the race plate 30 circumscribes the outlets 22 of the die plate 20. For example, the race plate 30 can be in the form of a hollow cylinder that circumscribes the outlets 22 of the die plate 20. The race plate 30 can have any suitable diameter, width, and thickness.

Figure 1:
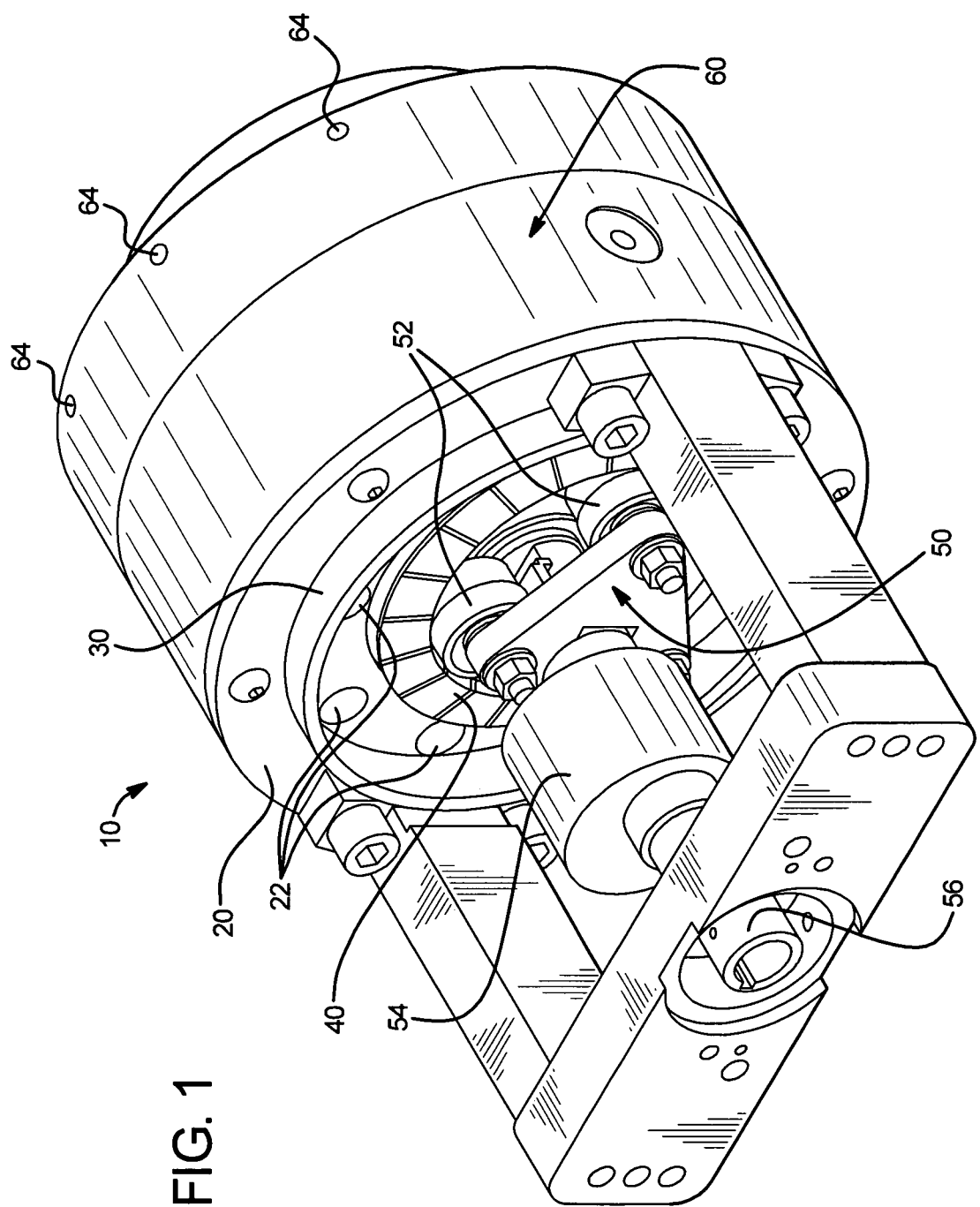
FIG. 1 illustrates a front perspective view of the rotary forming device in an embodiment of the invention.
Figure 2:
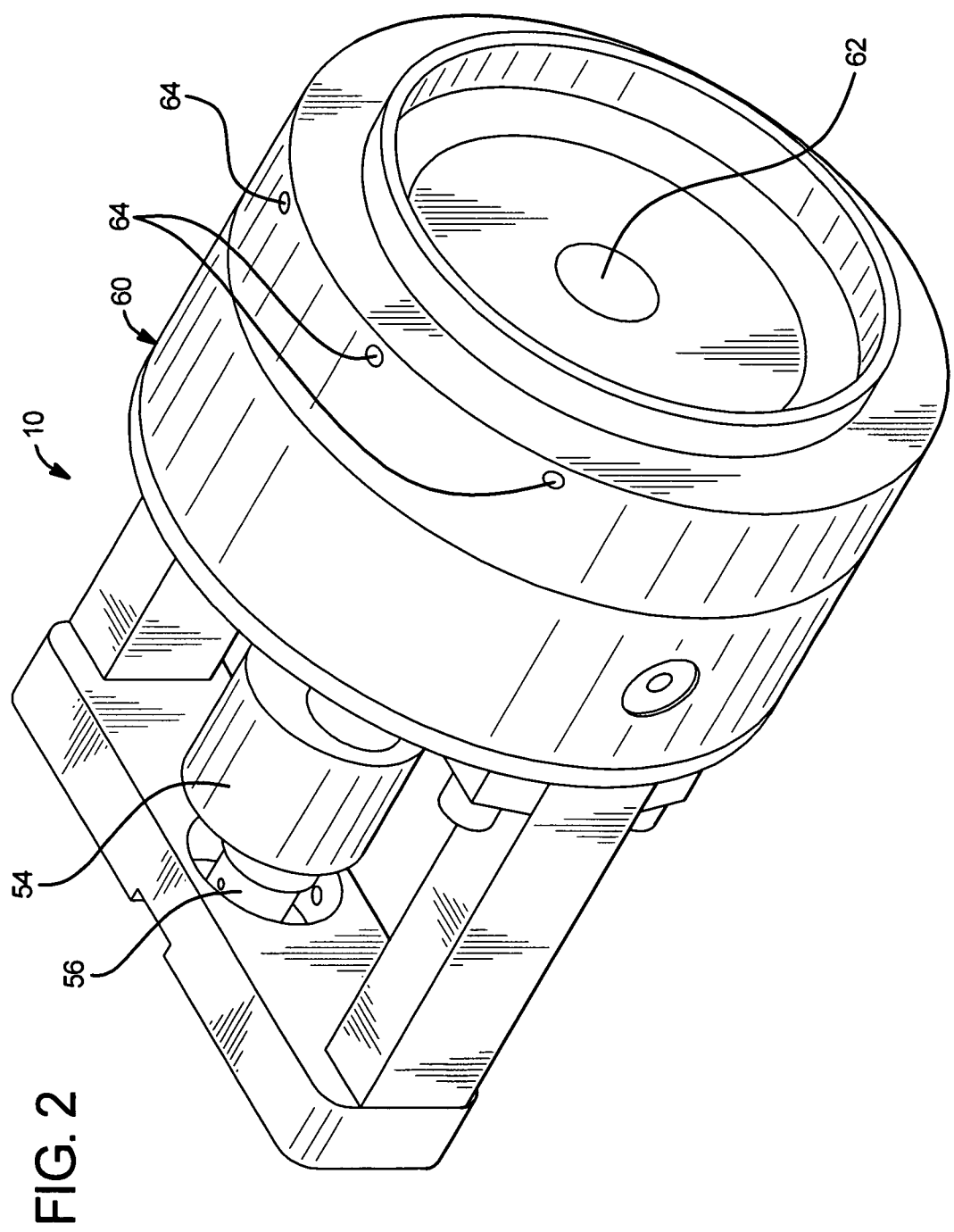
FIG. 2 illustrates a rear perspective view of the rotary forming device in an embodiment of the invention.
Figure 3:
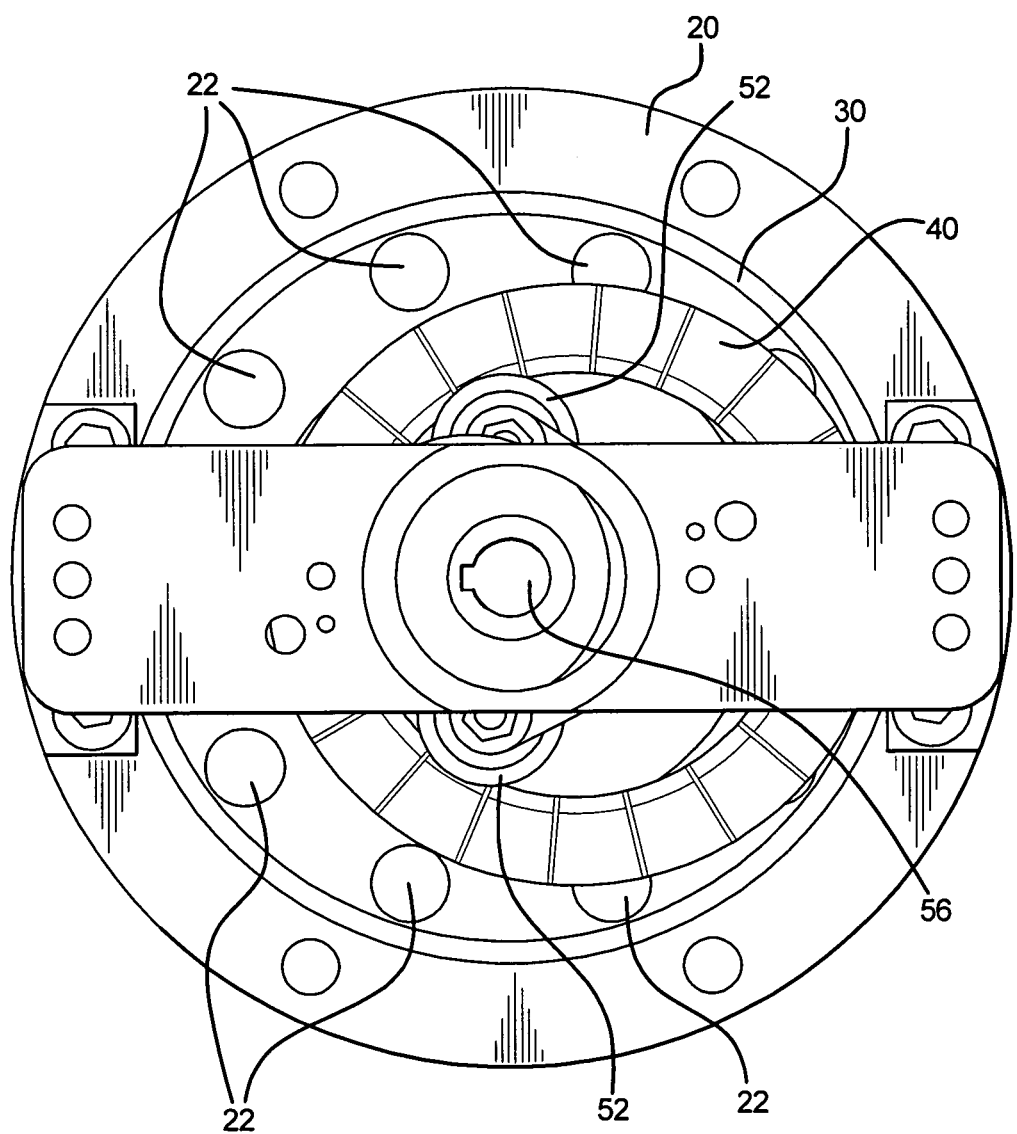
FIG. 3 illustrates a front elevation view of the rotary forming device in an embodiment of the invention.

As shown in FIGS. 1 and 3, a forming wheel 40 can be rotatably attached to the die plate 20. The forming wheel 40 can be constructed and arranged to rotate within and along an inner surface of the race plate 30 in a hypocycloid motion. During operation of the rotary forming device 10, a rotation of the forming wheel 40 forces a material exiting the outlets 22 of the die plate 20 between the outer circumferential surface of the forming wheel 40 and the inner surface of the race plate 30. As a result, the extruded material can be cut or substantially decreased in size at that location depending on the speed of rotation of the forming wheel 40 and the race plate 30.

Figure 4:
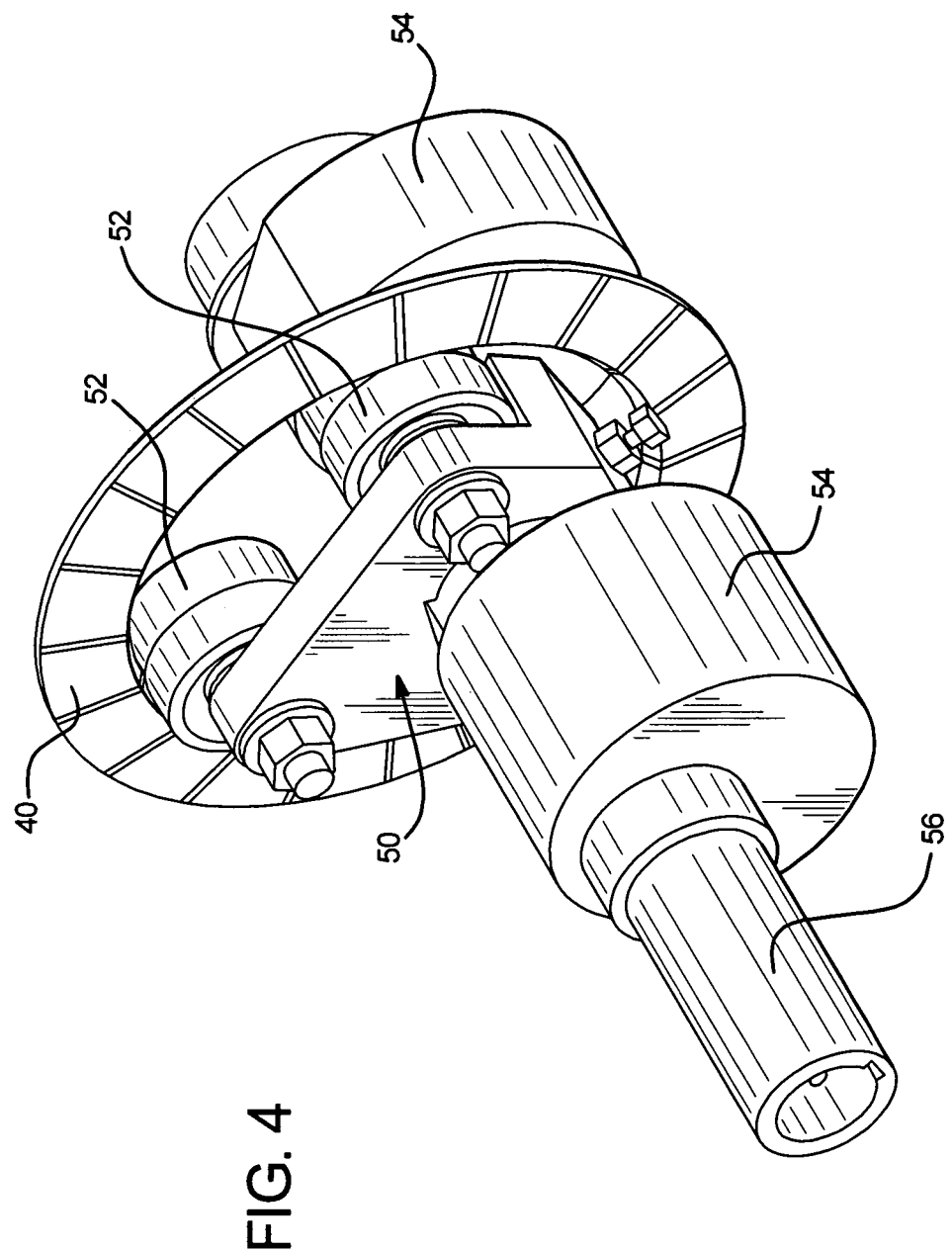
FIG. 4 illustrates a front perspective view of the motor assembly and forming wheel in an embodiment of the invention.

As shown in FIGS. 1 and 4, a motor assembly 50 can be attached to the forming wheel 40, for example, via one or more bearings 52 that rotate within an inner circumference of the forming wheel 40. The motor assembly 50 can be constructed and arranged to rotate the forming wheel 40 in a hypocycloid motion. In an embodiment, the motor assembly 50 comprises one or more counter balances 54 attached to a shaft 56 of the motor assembly 50. The counter balances 54 can provide stability as the motor assembly 50 rotates the forming wheel 40 within the race plate 30 at or near the face of the die plate 20.

In an embodiment, the forming device 10 further comprises a housing 60 attached to the die plate 20. The housing 60 can define an inlet 62. All or portions of the motor assembly 50 can be located in the housing 60. In another embodiment, the housing 60 can be attached to any suitable extruder, which extrudes a material into the inlet 62 of the housing 60. In an alternative embodiment, the die plate 20 can be directly attached to an extrusion device such as an extruder.

In yet another embodiment, the housing 60 can define one or more additional inlets 64 for use in making a center-filled product. For example, to manufacture the center-filled product, the outer material can enter inlet 62 of the housing 60 and one or more materials to be used as the center filling can enter inlets 64, which can exit the center of a concentric inner outlet or nozzle as discussed in more detail below.

The rotary forming device can be attached to the extruder in any suitable manner known by the skilled artisan. For example, the rotary forming device can be attached directly to an end of the extruder and be capable of producing formed products at the normal extruder rate (e.g. without having to reduce the extruder output rate). In other words, by attaching the housing or the die plate of the rotary forming device to an extruder, the rotary forming device does not limit the production rate of the extruder and fouling can be minimized or eliminated. In addition, the space required for the rotary forming device compared to traditional crimping equipment can be vastly reduced.

Any material or composition that exhibits thermoplastic behavior and is extrudable can be used in conjunction with the rotary forming device to manufacture formed products. The material can be, for example, a cereal-based food, protein-based food, human food, non-human animal food such as a pet food, plastic polymer, or a combination thereof.

The extrudable material can enter one or more housing inlets and exit through one or more corresponding die plate outlets. The extruded material exiting the die plate outlets can be in the form of a rope of a single composition or co-extruded compositions. The rope can also be hollow. Accordingly, in alternative embodiments, the forming device can be used to make crimped products, center-filled products and hollow products depending on the characteristics of the extrudate.

As previously discussed, the operation of the forming wheel revolves around the motion of a hypocycloid. In geometry, a hypocycloid is a special plane curve generated by the trace of a fixed point on a small circle that rolls within a larger circle. It is comparable to a cycloid but instead of the circle rolling along a line; it rolls within a circle (e.g. the race plate).

By using the principle of the hypocycloid in embodiments of the invention, the forming wheel can be constructed to move around the larger diameter race plate, which circumscribes the die plate outlets. The die plate outlets can be arranged in a circular design and be in close proximity to the inner surface of the race plate. The action of the forming wheel in conjunction with the race plate causes a rope of a material exiting the die plate outlets between the forming wheel and the race plate to be crimped or molded, sealed and subsequently separated into smaller pieces without stretching or tearing.

Figure 5:
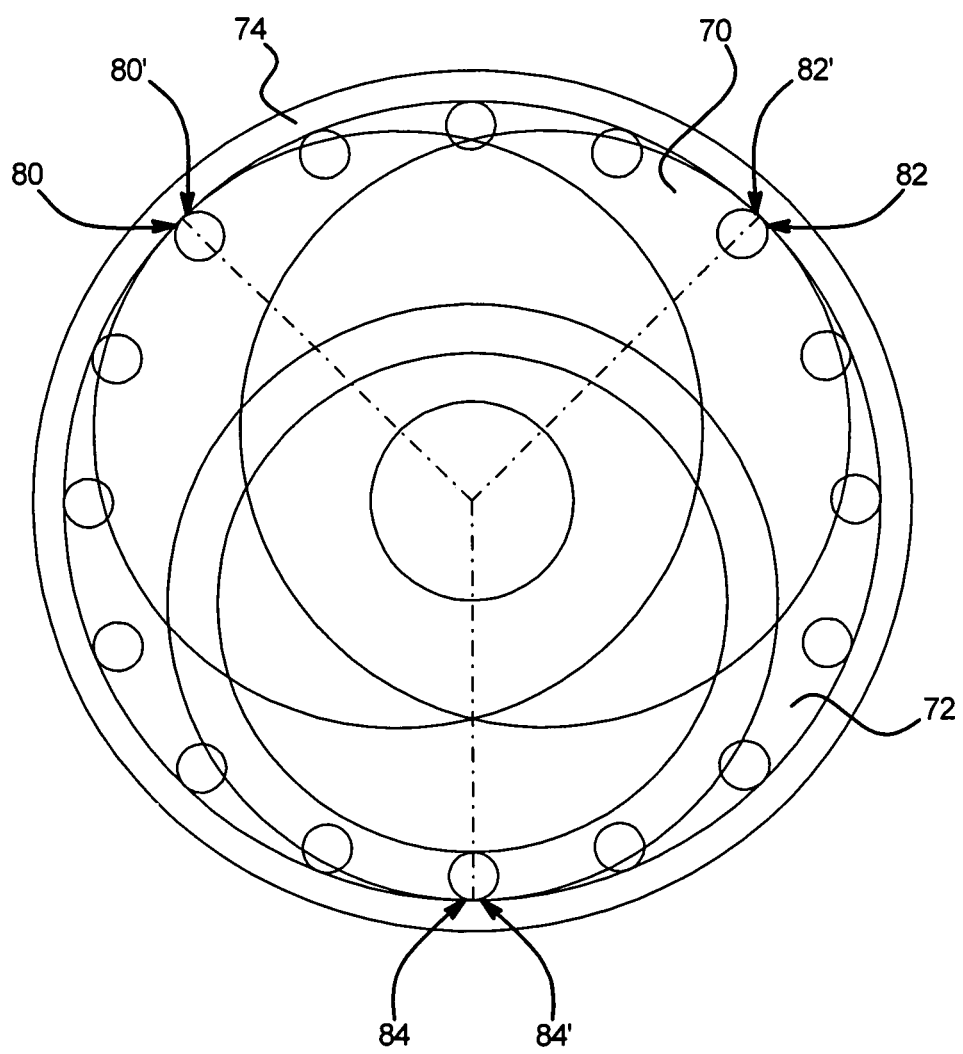
FIG. 5 illustrates a front view of the rotation of the forming wheel with respect to the die plate in an embodiment of the invention.

In an embodiment, FIG. 5 illustrates a path traversed by a forming wheel 70 across the face of a die plate 72 and where it approaches the race plate 74 as it turns and moves around. For simplification, three points on a race plate 74 (80, 82, and 84) where the path of the forming wheel 70 approaches are shown in FIG. 5. By the theory of the hypocycloid referenced above, one specific point (80' in FIG. 5) on the forming wheel 70 will approach the specific point on the race plate 80 every time regardless of the speed at which the forming wheel 70 moves. The same applies for points 82 and 82', 84 and 84' and all other corresponding points on the forming wheel 70 and race plate 74 in FIG. 5. Accordingly, the forming device in embodiments of the invention take advantage of the fact that the points on the forming wheel 70 and the race plate 74 that approach each other during rotation of the forming wheel 70 are always the same due to the principle of the hypocycloid.

To make a formed or crimped product using the rotary forming device in accordance with an embodiment of the invention, a first portion of an extrudate such as an extruded rope or other medium (e.g. made from cereal-based food, protein-based food, human food, non-human animal food such as a pet food, plastic polymer, etc.) exiting the die plate outlets is squeezed or pinched (e.g. crimped) between the rotating forming wheel and the static race plate during a first revolution of the forming wheel. Upon being squeezed, this first portion of the rope can be immediately detached from the remaining rope or be sufficiently narrowed in size while remaining part of the larger rope. The distance between the edges of the race plate and the forming wheel can determine whether the portion of the rope being squeezed is immediately detached from the remaining rope or be sufficiently narrowed in size, which makes a subsequent detachment easy.

The extruded rope having a cut or crimped first end can then be extruded further for a predetermined distance. This predetermined distance can be the desired length of the formed product. A second portion of the extruded rope exiting the die plate outlets is then squeezed or pinched between the rotating forming wheel and the static race plate during a second or subsequent revolution of the forming wheel. Upon being squeezed, this second portion of the rope can be immediately detached from the remaining rope leaving the formed product having crimped edges on both sides.

Alternatively, the second portion of the rope can be sufficiently narrowed in size while remaining part of the larger rope depending on the desired characteristics of the formed product. In other words, the crimped edges of the rope do not need to be made to detach immediately upon the rotation of the forming wheel. The formed or crimped products can then be subsequently detached at the narrowed portions in a separate step. This process generates formed or crimped product made from the extruded rope by the rotary forming device.

The ratio of the diameter of the forming wheel to the diameter of the race plate makes the forming positioning totally repeatable. The forming wheel runs elliptically around a fixed race plate and can crimp or cut extrudate ropes as they exit the die plate outlets depending on the distance between the forming wheel and the race plate at their closest proximity during rotation. The number of die plate outlets or openings is not limited by the rotary crimper. Because of the elliptical motion of the forming wheel, the drive mechanism or motor assembly can be designed to eliminate and balance the forces developed during operation of the rotary forming device.

The gap between the circumferential outer surface of the forming wheel and the inner surface of the race plate can be any suitable distance. In an embodiment, the circumferential outer surface of the forming wheel maintains contact with the inner surface of the race plate during rotation of the forming wheel. Alternatively, a circumferential outer surface of the forming wheel can be located a predetermined distance from the inner surface of the race plate during rotation of the forming wheel. For example, the gap can be about 1-9/1000th of an inch. This adjustment can be done with the forming wheel aligned top dead center with the race plate or anywhere on the race.

Figure 6:
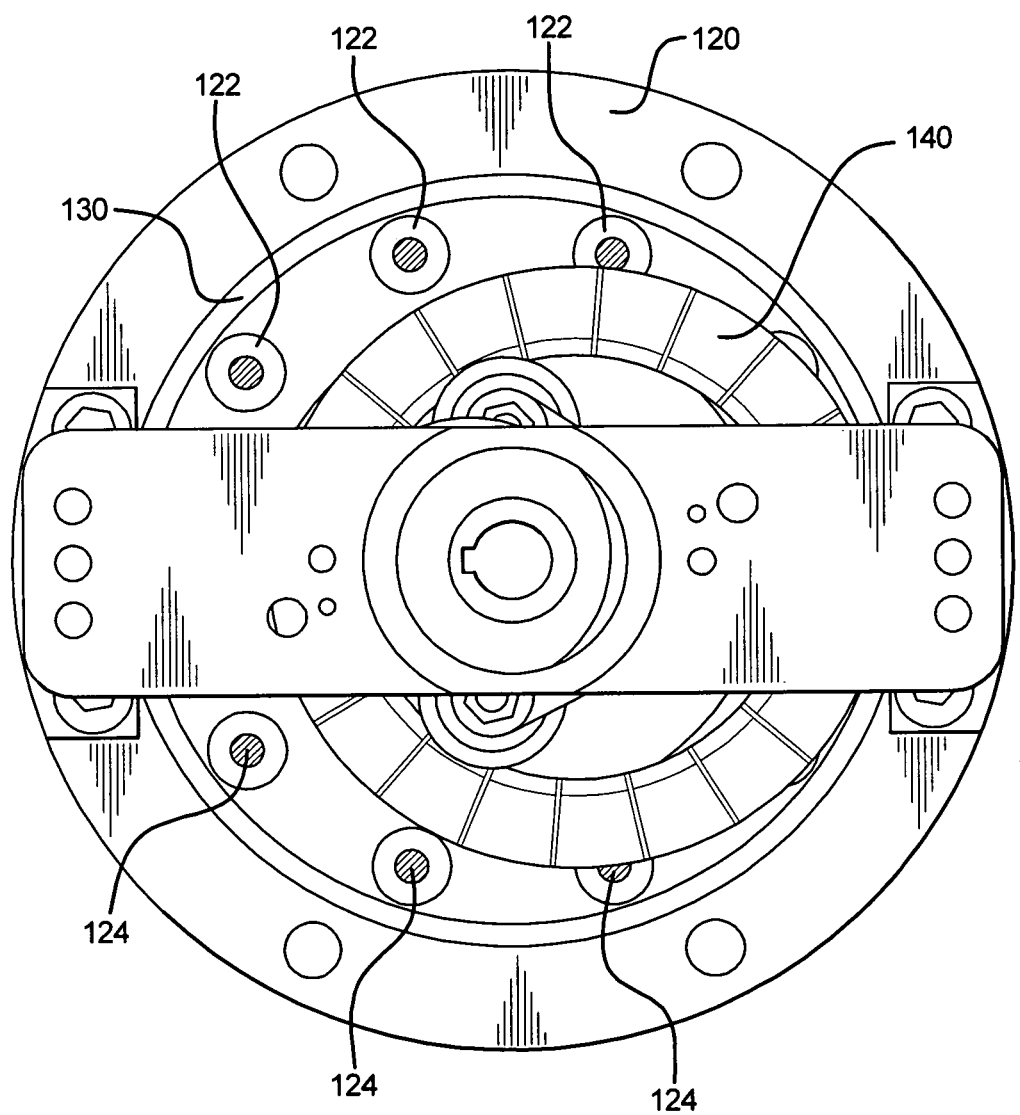
FIG. 6 illustrates a front elevation view of the rotary forming device in another embodiment of the invention.

In another embodiment illustrated in FIG. 6, the die plate further comprises a solid core within the outlet, the solid core having a width less than the outlet. The solid core can comprise any suitable shape (e.g. circle, square, or polygon) and be concentric with respect to the outlet. The concentric solid core enables the rope exiting the outlets of the die plate to be hollow thereby resulting in a hollowed product.

Figure 7:
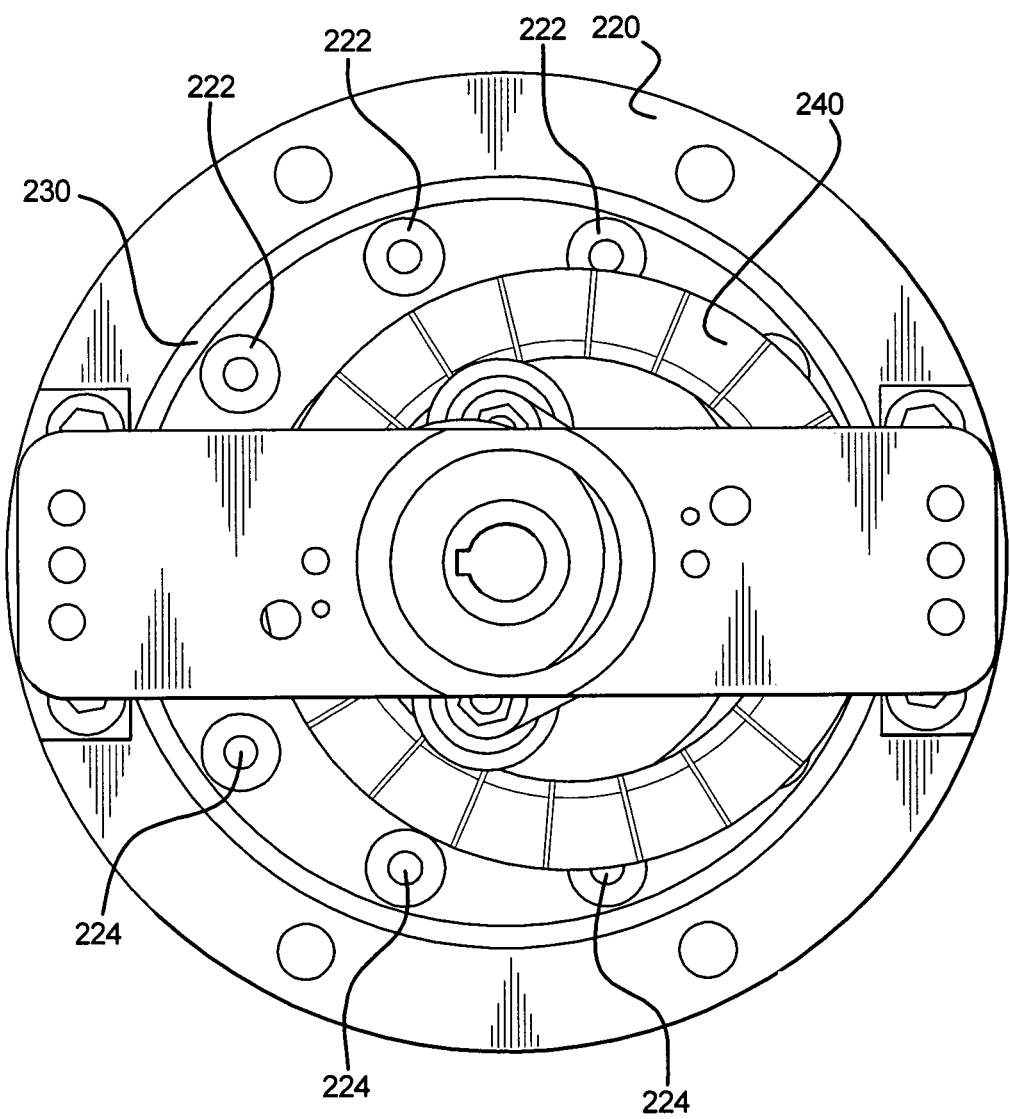
FIG. 7 illustrates a front elevation view of the rotary forming device in an alternative embodiment of the invention.
Figure 8:
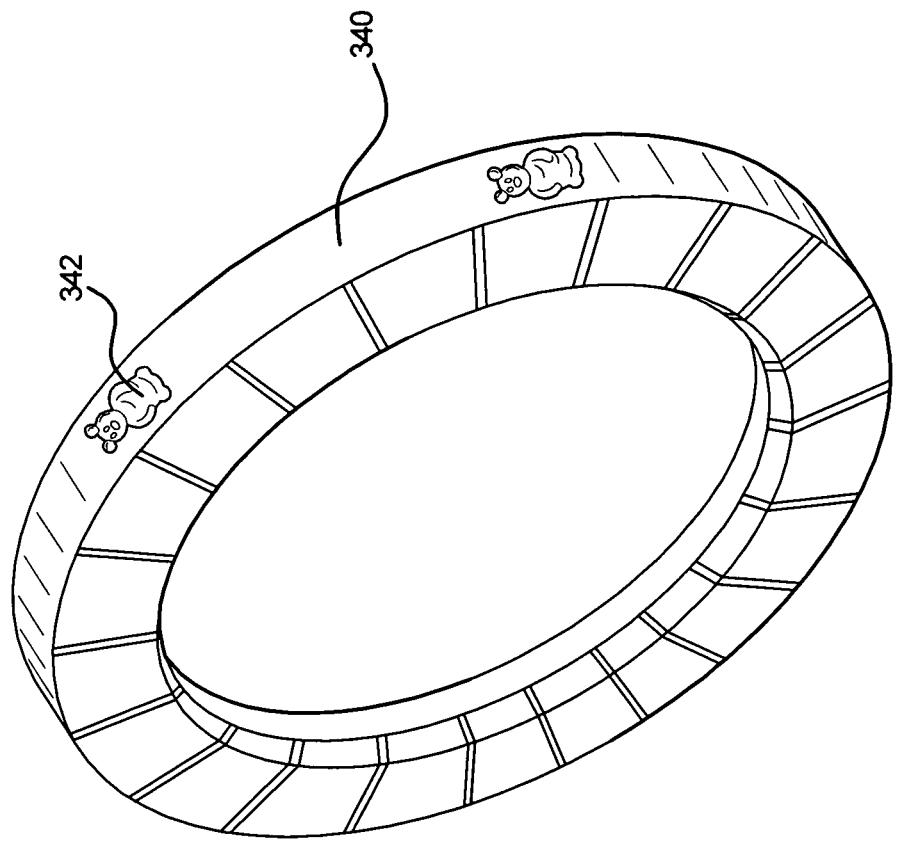
FIG. 8 illustrates a front perspective view of the forming wheel in an alternative embodiment of the invention.

In an alternative embodiment illustrated in FIG. 7, the die plate further comprises an inner outlet or nozzle within the outlet, the inner outlet having a width less than the outlet. The inner outlet or nozzle can comprise any suitable shape (e.g. circle, square, or polygon) and be concentric with respect to the outlet. A material to be used for the center filling can be extruded via the inner outlet along with the rope exiting the outlets of the die plate to generate a center-filled product in a manner similar to the previously described processes:

In another embodiment illustrated in FIG. 8, the forming wheel 340 can define a molded shape 342. By adjusting the thickness of the forming wheel 340, the rope exiting the die plate outlets from the extruder can be continuously molded into a desired shape as the forming wheel presses the extruded rope against the race plate leaving a molded shape on the side of the rope contacting the forming wheel. If only molding of one side of the extruded rope is desired, the race plate can be maintained with a flat inner surface.

In another embodiment, the inner surface of the race plate can define a corresponding molded shape aligned with the mold of the forming wheel. As a result, the extruded rope exiting the die plate outlets can be continuously molded on both sides (i.e. from the race plate mold and the forming wheel mold). The race plate mold and the forming wheel mold can be the same, similar or completely different depending on the desired shape of the molded product.

In an alternative embodiment, the invention provides a method of forming a product. The product can be, for example, a crimped or molded cereal-based food, protein-based food, human food, non-human animal food such as a pet food, or plastic polymer. The method comprises providing a die plate defining an outlet, a race plate attached to the die plate, and a forming wheel rotatably attached to the die plate. The method further comprises extruding a material a first distance through the outlet of the die plate, and forcing a portion of the material exiting the outlet of the die plate against an inner surface of the race plate by rotating the forming wheel. The material can be extruded a second distance through the outlet of the die plate, and a second portion of the material exiting the outlet of the die plate is forced against the inner surface of the race plate by rotating the forming wheel in a hypocycloid motion.

In yet another embodiment, the invention provides a method of forming a crimped or molded cereal-based food, protein-based food, human food, non-human animal food such as a pet food, or plastic polymer. The method comprises providing a die plate defining a plurality of outlets, a race plate attached to the die plate and circumscribing the outlets, and a forming wheel rotatably attached to the die plate. The method further comprises extruding a material a first distance through the outlets of the die plate and forcing a first portion of the material exiting the outlets of the die plate against an inner surface of the race plate by rotating the forming wheel in a hypocycloid motion. The material is extruded a second distance through the outlets of the die plate, and a second portion of the material exiting the outlets of the die plate is forced against the inner surface of the race plate by rotating the forming wheel in a hypocycloid motion. The crimped or molded products can be collected beneath the forming device, for example, on a tray or conveyor belt.

In another aspect, the invention provides an extrusion device comprising an extruder attached to a device comprising a die plate defining an outlet; a race plate attached to the die plate; and a forming wheel rotatably attached to the die plate. The extrusion device is useful for producing products such as filled and unfilled "pillow" shaped products using the methods described herein. The extrusion device can be. any extruder known to skilled artisans, e.g., single and twin screw extruders useful for plastics and food compositions. Such extruders are available from various manufacturers, e.g. Wenger Manufacturing Inc.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A device comprising:
   a die plate comprising a face defining an outlet;
   a race plate that circumscribes and extends from the face of the die plate, wherein the race plate is a hollow cylinder having an inner surface; and
   a forming wheel attached to the die plate to rotate within the race plate, wherein a circumferential outer surface of the forming wheel maintains contact with the inner surface of the race plate at specific points during each rotation of the forming wheel.

2. The device of claim 1 wherein the die plate is attached to an extrusion device.

3. The device of claim 1 wherein the forming wheel is constructed and arranged to rotate in a hypocycloid motion.

4. The device of claim 3 wherein a circumferential outer surface of the forming wheel maintains contact with an inner surface of the race plate during rotation of the forming wheel.

5. The device of claim 4 wherein a rotation of the forming wheel forces a material exiting the outlet of the die plate against the inner surface of the race plate.

6. The device of claim 1 wherein the die plate defines a plurality of outlets.

7. The device of claim 1 wherein a point on a circumferential outer surface of the forming wheel moves across a same corresponding point on the die plate outlet during continuous revolutions of the forming wheel.

8. The device of claim 1 wherein the die plate further comprises a solid core within the outlet, the solid core having a width less than the outlet.

9. The device of claim 1 wherein the die plate further comprises an inner outlet within the outlet, the inner outlet having a width less than the outlet.

10. The device of claim 1 wherein the forming wheel defines a recessed molded shape at a circumferential surface of the forming wheel.

11. A device comprising:
    a housing comprising a die plate comprising a face defining a plurality of outlets, the housing defining an inlet;
    a race plate attached to the die plate, the race plate circumscribes and extends from the face of the die plate;
    a forming wheel rotatably attached to the die plate to rotate within the race plate, wherein a circumferential outer surface of the forming wheel maintains contact with the inner surface of the race plate at specific points during each rotation of the forming wheel; and
    a motor assembly attached to the forming wheel, the motor assembly constructed and arranged to rotate the forming wheel in a hypocycloid motion.

12. The device of claim 11 wherein the housing is attached to an extrusion device.

13. The device of claim 11 wherein a part of the motor assembly is located in the housing.

14. The device of claim 11 wherein the motor assembly comprises at least one counter balance attached to a shaft of the motor assembly.

15. The device of claim 11 wherein a circumferential outer surface of the forming wheel maintains contact with an inner surface of the race plate during rotation of the forming wheel.

16. The device of claim 15 wherein a rotation of the forming wheel forces a material exiting the outlets of the die plate against the inner surface of the race plate.

17. The device of claim 11 wherein a point on a circumferential outer surface of the forming wheel moves across a same corresponding point on the die plate outlet during continuous revolutions of the forming wheel.

18. The device of claim 11 wherein the die plate further comprises a concentric solid core within the outlet, the solid core having a width less than the outlet.

19. The device of claim 11 wherein the die plate further comprises a concentric inner outlet within the outlet, the inner outlet having a width less than the outlet.

20. The device of claim 11 wherein the forming wheel defines a recessed molded shape at a circumferential surface of the forming wheel.

* * * * *